United States Patent [19]

Smith, Jr.

[11] 3,724,216

[45] Apr. 3, 1973

[54] COMBINED ROCKET-RAM-JET AIRCRAFT

[75] Inventor: E. Quimby Smith, Jr., Oxnard, Calif.

[73] Assignee: The United States of America as represented by the Secretary of the Navy

[22] Filed: June 13, 1957

[21] Appl. No.: 665,612

[52] U.S. Cl. ......................60/245, 60/270, 60/271
[51] Int. Cl. ..............................................F02k 3/00
[58] Field of Search..........60/35.6 RR, 35.6 RS, 245; 102/49

[56] References Cited

UNITED STATES PATENTS

| | | | |
|---|---|---|---|
| 1,901,852 | 3/1933 | Stolfa et al. | 102/34.5 |
| 2,712,217 | 7/1955 | Sargent et al. | 60/35.6 R |
| 2,806,350 | 9/1957 | Hoffman | 60/35.6 R |
| 2,850,872 | 9/1958 | Stockbarger et al. | 60/35.6 R |
| 2,623,465 | 12/1952 | Jasse | 102/49 |
| 2,799,987 | 7/1957 | Chandler | 60/35.6 RR |

FOREIGN PATENTS OR APPLICATIONS

| | | | |
|---|---|---|---|
| 590,177 | 7/1947 | Great Britain | 60/35.6 R |

*Primary Examiner*—Samuel Feinberg
*Attorney*—R. S. Sciascia, Q. B. Warner and J. M. St. Armand

EXEMPLARY CLAIM

1. In a combined rocket-ram-jet aircraft, a tubular casing having both an inlet and an outlet for ram air, a tubular mass of solid propellant concentrically disposed within said tubular casing for rocket motor operation, a liquid ram-jet fuel container concentrically disposed within said tubular mass for ram-jet motor operation, a combustion chamber comprising a tubular chamber concentrically disposed between said tubular casing and said solid propellant in a manner to permit radial burning of said solid propellant, a mechanical valve composed of non-consumable material and of generally annular configuration encircling said liquid fuel container and positioned between said combustion chamber and said ram-air inlet so as to prevent air flow through the combustion chamber when in closed position, said valve being maintained in closed position by contact with said solid propellant, said valve comprising a plurality of radially-hinged flaps designed to be substantially air-tight when in contact with said solid propellant and being opened by the pressure of ram air when said tubular mass has been consumed in a manner to permit ram air to pass to said combustion chamber whereby said ram-jet motor becomes operative to sustain flight of said aircraft.

2 Claims, 6 Drawings

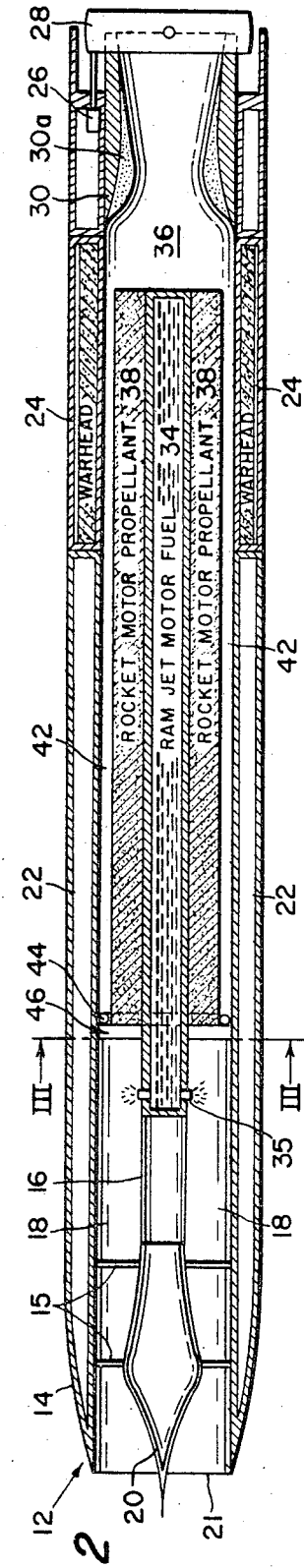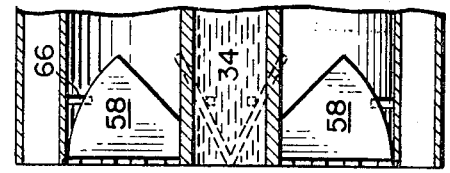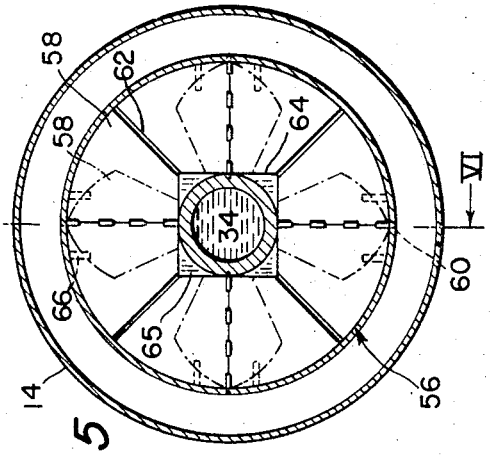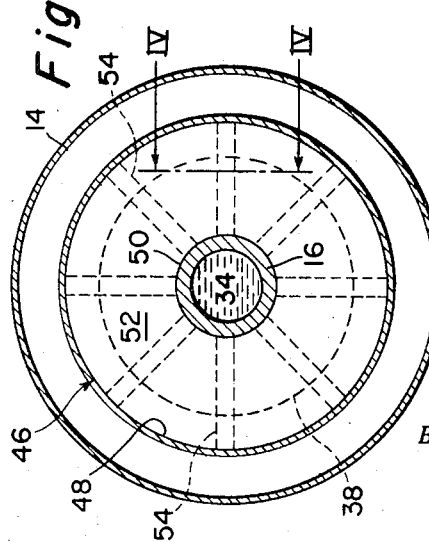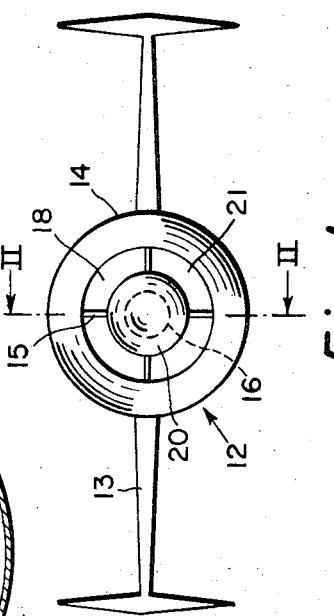

COMBINED ROCKET-RAM-JET AIRCRAFT

The invention described herein may be manufactured and used by or for the Government of the United States of America for governmental purposes without the payment of any royalties thereon or therefor.

This invention relates to ram-jet missiles employing booster motors, and more particularly to such a missile in which a common combustion chamber is provided for both the ram-jet and booster propulsion systems.

The merits of ram-jet propulsion systems are well known. However, to attain optimum operating conditions for a missile employing this type of propulsion system requires a separate booster system to rapidly propel the missile up to the operating speeds of the ram-jet system which may exceed speeds of Mach 3. Heretofore, such booster systems relied upon one or more separate rocket booster motors detachably mounted to the exterior of the missile. These prior missile configurations result in excessive weight and size over optimum design, and create a personnel and equipment hazard from the falling booster motor upon separation from the missile.

These problems are avoided in the present invention by incorporating the booster system as an integral part of the ram-jet system within the missile in such a manner that a common combustion area is provided. In the preferred embodiment the sustainer and booster systems are arranged in concentric relation within the missile, the booster motor also functioning to preheat the ram fuel for more efficient operation. This configuration also resolves unstable burning problems, For more efficient operation in both the boost phase and the sustainer phase in missile flight, the missile is provided with a nozzle formed of a consumable throat portion presenting two different size nozzle throats each throat being utilized during the operation of the respective motor system.

A principle object of the present invention is to provide a missile having both an internally housed booster motor system and a ram-jet propulsion system, and a corollary object is to provide said propulsion systems with a common combustion chamber in the missile.

A further object of the invention is to provide a combined rocket-ram-jet missile wherein ignition of the rocket motor functions to preheat the ram-jet fuel, and in some installations the rocket motor may also be used to ignite the ram-jet motor.

Still another object of the invention is to provide a single nozzle for a combined rocket-ram-jet missile adaptable for use in sequence with both propulsion systems.

Other objects and many of the attendant advantages of this invention will be readily appreciated as the same becomes better understood by reference to the following detailed description when considered in connection with the accompanying drawings wherein:

FIG. 1 is a front elevation view of a novel combined rocket-ram-jet missile showing one arrangement of a concentric outer solid propellant rocket motor and an inner liquid propellant ram-jet motor;

FIG. 2 is a longitudinal section of the combined rocket-ram-jet missile taken along line II — II of FIG. 1;

FIG. 3 is an enlarged transverse sectional view taken along line III — III of FIG. 2 showing a flow control means in assembled position within the missile;

FIG. 4 is a partial cross-sectional view taken along line IV — IV of FIG. 3;

FIG. 5 is a similar view as FIG. 3 showing a modified flow control means illustrating the flaps thereof in both closed and open positions; and FIG. 6 is a longitudinal section taken along line VI — VI of FIG. 5 showing the flow control in an open position after rocket burn-out admitting ram air to the combustion chamber of the missile.

Referring now to the drawings wherein like reference characters designate corresponding parts throughout the views, there is shown in FIGS. 1 and 2 a combined rocket-ram-jet missile 12 having a conventional planaform wing structure 13. Missile 12 comprises a hollow outer tube 14 forming a missile casing within which is supported by spaced stringers 15 an axially aligned inner tube 16 concentrically spaced from the outer tube at 18. The forward end of outer tube 14 is open and in conjunction with a forward spiked end 20 of inner tube 16 forms a ring-shaped inlet 21 for admitting ram air to space 18 and the ram-jet propulsion motor in a manner presently to be described.

Hollow outer tube 14 can be utilized for housing an electronics compartment 22, a rod type warhead 24 of hollow tubular cross section and any other missile components, for example, an actuating means 26 for driving a ring-type steering mechanism 28 concentrically mounted about jet nozzle 30. The space utilization of the outer tube will vary depending on the type of missile and other design characteristics.

Inner tube 16 can be also utilized to house various components, for example, the spiked forward end 20 is particularly suitable for containing a guidance system, and an aft portion of the inner tube is used to contain a ram-jet fuel container 34 serving as a component of the principle propulsion system of the missile. Ram-jet fuel container 34 illustrated in FIG. 2 is for a motor of a type that employs a conventional pressurized liquid fuel which at a predetermined sequence in the boost phase of missile flight is sprayed into annular space 18 through orifices 35 to initiate the sustainer phase. Ram-jet fuel container 34 is supported in the aft portion of the missile by suitable stringers 15, motor 34 being longitudinal spaced from nozzle 30 to form a combustion area 36 therebetween. The combustion chamber can be cylindrical, oval, rectangular, or irregularly shaped in cross-sectional area depending on the missile configuration. It should be noted that the combustion chamber of the missile includes the combustion area 36 forming an extension of the combustion areas in the respective motor systems as presently to be described.

A rocket booster motor including a solid propellant 38 is housed in space 18 between the outer and inner tubes, and extends from a point aft of jet orifices 35 to the vicinity of combustion area 36. Rocket propellant 38 is illustrated as a solid type in which case an outer annular space 42 can be provided between outer tube 14 and the peripheral surface of the propellant grain to enable the grain to burn radially inwardly when ignited by a ring-shaped squib 44. It is obvious that the grain configuration can be varied to achieve the desired burning characteristics. By positioning the rocket motor concentrically around the ram-jet fuel, ignition of the rocket propellant during the boost phase of the missile flight serves to preheat tube 16 and the ram-jet fuel contained therein immediately prior to use in the sustainer phase. Thereafter, the hot walls of inner tube 16 can be utilized to ignite the ram-jet fuel ejected in space 18 and propelled over the inner tube, the burned out rocket space also functioning as a combustion area in conjunction with combustion area 36 during ram-jet operation. The particular arrangement of the rocket motor and ram jet motor within the aircraft may vary depending on the particular missile construction and disposition of the missile components.

Because operation of the jet motor is not normally desired during rocket ignition in the boost phase, ram air in space 18 is blocked during rocket motor ignition. To ensure this condition, a ram air flow control means 46 (FIG. 2) is mounted in annular space 18 adjacent the forward end of rocket motor 38. The details of one type of flow control means is shown in FIGS. 3 and 4 being washer-shaped and having an outer peripheral edge 48 conforming to the core of outer tube 14, and an inner peripheral edge 50 conforming to the outer diameter of inner tube 16. Control means 46 is made substantially of a consumable material 52 supported, if necessary, by a plurality radially extending spaced stringers 54 having opposite ends secured to the respective tubes in any suitable manner. Consumable material 52 has a slower rate of burning than the solid rocket fuel so that after combustion of the latter, the former will be sufficiently consumed or weakened to admit ram air between the angle iron stringers into the rocket motor space formerly occupied by its solid propellant.

Stringers 54, in addition to supporting the consumable material, can be constructed to function as flame holders for producing a stabilized flame front during ram jet operation. In FIGS. 3 and 4 this flame holder function is obtained by constructing stringers 54 as angle irons with their vertexes directed toward the ram air inlet. This arrangement introduces turbulence in the ram air flow adjacent the free ends of the legs of the angle irons for mixing the liquid ram jet fuel and ram air, and producing an environment more conducive to ignition in the forward end of the combustion area. Thus, the burned-out rocket space in conjunction with combustion area 36 substantially increasing the total combustion area, ensuring more complete combustion of the fuels and stabilizing burning conditions.

A modified ram air flow control means 56 is illustrated in FIGS. 5 and 6 and consists of a plurality of pairs of butterfly flaps 58, each pair being intermediately hinged at 60 transversely between the inner and outer tubes for movement in an aft direction only. In the closed position as shown in solid lines in FIG. 5, the flaps all lie in a common plane transversely the tubes and form a substantially solid wall, being restrained in this blocking position by abutment of the solid rocket propellant 38 opposing the force of the ram air acting in space 18. Adjacent lateral flap edges 62 are shown in FIG. 5 to abut each other, however, they can be constructed to lie in overlapping arrangement in closed position if a more effective ram air seal is required. The outer peripheral flap edges have a radius of curvature substantially that of the core of outer tube 14, the opposite inner edges 64 being substantially straight and normal to their pivot axes to permit opening of the flaps without interference with the ram-jet motor casing (see FIG. 6). A square filler panel 65 encompasses inner tube 16 and forms a stationary part of the flame holder to complete closure of the space 18. Flaps 58 are maintained in the closed position by and until the solid rocket propellant is substantially consumed when the ram air acting on the other side of the flame holder forces the flaps open about their hinge axis to the open position shown in FIG. 6. Each pair of flaps can be provided with two stop members 66 mounted to the inner tube for limiting the maximum opening of the flaps for optimum burning efficiency. In the open position, each pair of flaps function as flame holders in a manner similar to angle iron stringers 54.

This invention combines a rocket booster motor and ram-jet sustainer motor within the missile enabling the use of a common combustion chamber. It naturally follows that this combination can advantageously utilize a common nozzle 30. However, as the booster and sustainer motors normally operate at different pressures, different size nozzles throats are desirable to attain maximum operating efficiency. This result can be achieved by constricting the nozzle with a consumable throat portion 30a which is burned out during operation of the rocket motor in the boost phase, and presenting an enlarged counterpart nozzle throat portion for the ram-jet motor operation.

This invention provides a combined rocket ram-jet aircraft particularly suitable for guided missiles wherein the rocket booster motor and ram-jet sustainer motor are disposed within the confines of the missile as an integral part thereof. This construction eliminates external rocket motors and the inherent problems of separation. The two motors are so interrelated that the rocket motor forms a combustion area for jet motor operation and controls the passage of ram air for the operation of the ram-jet motor directly, or indirectly, by means of ram air flow control means. The ram air control flow means can also serve as a flame holder increasing the combustion area and ensuring more efficient burning. The ram-jet sustainer motor may use liquid or solid propellant fuel, the liquid fuel requiring a suitable container and fuel ejection mechanism not required for solid propellants. The relative dimensions of the motors will depend on various factors, such as missile range, etc.

Obviously many modifications and variations of the present invention are possible in the light of the above teachings. It is therefore to be understood that within the scope of the appended claims the invention may be practiced otherwise than as specifically described.

I claim:

1. In a combined rocket-ram-jet aircraft, a tubular casing having both an inlet and an outlet for ram air, a tubular mass of solid propellant concentrically disposed within said tubular casing for rocket motor operation, a liquid ram-jet fuel container concentrically disposed within said tubular mass for ram-jet motor operation, a combustion chamber comprising a tubular chamber concentrically disposed between said tubular casing and said solid propellant in a manner to permit radial burning of said solid propellant, a mechanical valve composed of non-consumable material and of generally annular configuration encircling said liquid fuel container and positioned between said combustion chamber and said ram-air inlet so as to prevent air flow through the combustion chamber when in closed position, said valve being maintained in closed position by contact with said solid propellant, said valve comprising a plurality of radially-hinged flaps designed to be substantially air-tight when in contact with said solid propellant and being opened by the pressure of ram air when said tubular mass has been consumed in a manner to permit ram air to pass to said combustion chamber whereby said ram-jet motor becomes operative to sustain flight of said aircraft.

2. A combined rocket-ram-jet aircraft according to claim 1, in which the outlet for ram air from said combustion chamber is in the form of a nozzle having inner and outer concentric portions the respective initial apertures of which are chosen in accordance with the optimum operating characteristics of said rocket motor and said ram-jet motor, respectively, the inner portion of said nozzle being consumable during operation of said rocket motor so that the outer nozzle portion only is present to be utilized during operation of said ram-jet motor.

* * * * *